US011182727B2

(12) United States Patent
Sridhara et al.

(10) Patent No.: US 11,182,727 B2
(45) Date of Patent: Nov. 23, 2021

(54) AUTOMATICALLY DETECTING INCONSISTENCIES BETWEEN A BUSINESS PROCESS MODEL AND A CORRESPONDING TUTORIAL VIDEO

(71) Applicant: International Business Machines Corporation, Armonk, NY (US)

(72) Inventors: Giriprasad Sridhara, Bangalore (IN); Sampath Dechu, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 455 days.

(21) Appl. No.: 16/180,352

(22) Filed: Nov. 5, 2018

(65) Prior Publication Data
US 2020/0143299 A1     May 7, 2020

(51) Int. Cl.
   *G06Q 10/06*            (2012.01)
   *G06N 5/02*             (2006.01)
   *G10L 15/26*            (2006.01)

(52) U.S. Cl.
CPC ............ *G06Q 10/067* (2013.01); *G06N 5/02* (2013.01); *G06Q 10/0633* (2013.01); *G10L 15/26* (2013.01)

(58) Field of Classification Search
CPC .... G06Q 10/067; G06Q 10/0633; G06N 5/02; G10L 15/26
USPC ....................................................... 705/7.27
See application file for complete search history.

(56) References Cited

U.S. PATENT DOCUMENTS

| | | | | |
|---|---|---|---|---|
| 7,493,593 | B2* | 2/2009 | Koehler | ............... G06Q 10/10 |
| | | | | 717/106 |
| 9,497,263 | B2* | 11/2016 | Chakravarthy | .... H04N 21/4886 |
| 10,325,215 | B2* | 6/2019 | York | .................... G06F 40/211 |
| 2002/0194039 | A1* | 12/2002 | Bhaskaran | ......... G06Q 30/0202 |
| | | | | 705/7.31 |

(Continued)

OTHER PUBLICATIONS

Gustav et al "BPMN 2.0 for Modeling Business Processes", Apr. 2014, Handbook on Business Process Management 1 pp. 219-250 | (Year: 2014).*

(Continued)

*Primary Examiner* — Romain Jeanty
(74) *Attorney, Agent, or Firm* — Ryan, Mason & Lewis, LLP

(57) ABSTRACT

Methods, systems, and computer program products for detecting inconsistencies between a business process model of an organization and its accompanying tutorial video are provided herein. A computer-implemented method includes identifying activities within a business process model and assigning a concept to each activity within the business process model; constructing a confluence graph for a tutorial video corresponding to the business process model by (i) generating text corresponding to audio of the tutorial video and identifying activities within the text, and (ii) assigning a concept for each activity within the text and creating a concept node, within the confluence graph, for each concept assigned to an activity within the text; comparing the concepts of the business process model and the concept nodes of the confluence graph to identify inconsistencies between the business process model and the corresponding tutorial video; and outputting the identified inconsistencies to at least one user.

20 Claims, 12 Drawing Sheets

(56) References Cited

U.S. PATENT DOCUMENTS

| | | | |
|---|---|---|---|
| 2006/0184419 A1* | 8/2006 | Postrel | G06Q 20/22 |
| | | | 705/14.12 |
| 2006/0242207 A1* | 10/2006 | Tsyganskiy | G06F 8/72 |
| 2011/0320240 A1 | 12/2011 | Flores et al. | |
| 2013/0073334 A1* | 3/2013 | Favre | G06T 11/206 |
| | | | 705/7.27 |
| 2014/0214691 A1* | 7/2014 | Morris, III | G06Q 10/101 |
| | | | 705/300 |
| 2015/0220589 A1* | 8/2015 | Kummer | G06F 16/2365 |
| | | | 707/690 |
| 2017/0372407 A1 | 12/2017 | Konigsberg et al. | |

OTHER PUBLICATIONS

Mario et al (Modeling and Simulation of Business Processing Using BPMN 2.0), May 2013, Department of Information Engineering, Center for Logistics Systems Pisa, pp. 1-177 (Year: 2013).*

Takuro "Covering problems in edge-and node-weighted graphs", Dec. 2016, Discrete Optimization, pp. 40-61 (Year: 2016).*

Sergey "Business Process Model Abstraction", Business Process Technology Group Hasso Plattner Institute, University of Potsdam Potsdam, Germany, pp. 1-151. (Year: 2011).*

A. Mishra, "Automatic Detection of Semantic Inconsistency Between BPMN Process Model and SBVR Rule Model," Indraprastha Institute of Information Technology, Delhi (IIIT-D), India, Aug. 22, 2015, 59 pages.

H. V. D. Aa et al., "Detecting Inconsistencies between Process Models and Textual Descriptions," Lecture Notes In Computer Science, Aug. 13, 2015, pp. 90-106 pages, vol. 9253.

* cited by examiner

100

Open in browser the url www.OrganizationA.com/hrms —102

Enter username —104

Enter password —106

Click Submit —108

Click on Claims Tab —110

Select House Rent Allowance from List of Claims —112

Enter basic salary —114

Enter house rent allowance claimed —116

Enter house rent paid —118

Enter the PAN number (of the landlord) —126

Upload the rental agreement (Click on the upload rental agreement button) —128

Upload rent receipt (Click on the upload rent receipt button) —130

Click Submit —120

Click Logout —122

Close Browser —124

FIG. 3

AUTOMATICALLY DETECTING INCONSISTENCIES BETWEEN A BUSINESS PROCESS MODEL AND A CORRESPONDING TUTORIAL VIDEO

FIELD

The present invention generally relates to information technology (IT), and more particularly, relates to managing business processes.

BACKGROUND

Organizations commonly establish well-defined business processes for employees and/or consultants, wherein such processes can be directed to supporting the overall business and standardizing policies, operations and practices. Conventional business process models can often be accompanied by a tutorial video accessible through a network such as the public internet or an organization's intranet. The tutorial video is commonly more detailed than the business process model and provides step-by-step instructions to successfully navigate and accomplish objectives of the business process.

However, the business processes of an organization are subject to change, modification, and/or elimination. In the event of such an event, the business process model and the tutorial video associated with the business process model would require concurrent modification or reprogramming. Unfortunately, inconsistent practices within an organization may result in only one of the business process model or the tutorial video being modified. This inconsistency could lead to end-user confusion and/or other operational issues for the organization.

SUMMARY

Embodiments of the present invention provide techniques for detecting inconsistencies between a business process model of an organization and its accompanying tutorial video.

In one embodiment, a method includes identifying activities within a business process model and assigning a concept to each activity within the business process model, and constructing a confluence graph for a tutorial video corresponding to the business process model by (i) generating text corresponding to audio of the tutorial video and identifying activities within the text and (ii) assigning a concept for each activity within the text and creating a concept node, within the confluence graph, for each concept assigned to an activity within the text. Such a method can also include comparing the concepts of the business process model and the concept nodes of the confluence graph to identify inconsistencies between the business process model and the corresponding tutorial video, and outputting the identified inconsistencies to at least one user.

Another embodiment of the invention or elements thereof can be implemented in the form of a computer program product tangibly embodying computer readable instructions which, when implemented, cause a computer to carry out a plurality of method steps, as described herein. Furthermore, another embodiment of the invention or elements thereof can be implemented in the form of a system including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is a schematic of the exemplary tutorial video of FIG. 2 modified to include additional activities according to one or more embodiments of the present invention.

DETAILED DESCRIPTION

Illustrative embodiments will be described herein below of a methodology, system and computer program product for detecting inconsistencies between a business process model (BPM) and its corresponding tutorial video. According to some embodiments of the present invention, there are provided methods and systems for detecting such inconsistencies by analyzing and comparing one or more concepts extracted from each of the business process model and the tutorial video. In some embodiments, the concepts are extracted through "speech tagging" of text within the business process model and the text of the audio of the tutorial video. Further illustrative embodiments include generating graphical models of concepts of the business process model and the tutorial video, and, optionally performing a graph isomorphism between the two graphs to identify any inconsistencies.

As detailed herein, a business process model is a tool utilized by organizations for documenting and improving business operations, policies and practices. Most organizations generate numerous models for business practices inclusive of human resources (HR), manufacturing, finance, health services, etc. Most business process models are generated in graphical form, diagrams or flow charts, which detail a set of activities or tasks required to accomplish a specific organizational goal. To ensure conformance with the business process model and assist the end-user, organizations will generate tutorial videos which provide a more detailed step by step process to accomplish the objective of the business process model. The tutorial videos require user input and may be accessible through a network.

As business processes evolve or change within an organization, these changes must be reflected in the business process model and in the tutorial video. Due to lack of resources, volume of business process models maintained within an organization, etc., a change, modification and/or alteration in a business process may not be carried over to the business process model and/or the tutorial video. In fact, it is not uncommon for the tutorial video to be updated by IT personnel within the organization while the business process model remains unchanged, or alternatively, the business process model may be updated while the tutorial video is unchanged.

By way merely of illustration, a basic representative example of a business process model and its corresponding tutorial video will be described. For example, with reference to FIG. 1, a simple business process model 10 directed to claiming a house rent allowance for an employee of organization A is illustrated. The business process model 10 describes three easily identified activities, namely, "enter basic salary" 12, "enter house allowance claimed" 14 and "enter house rent paid" 16.

Figure 1:
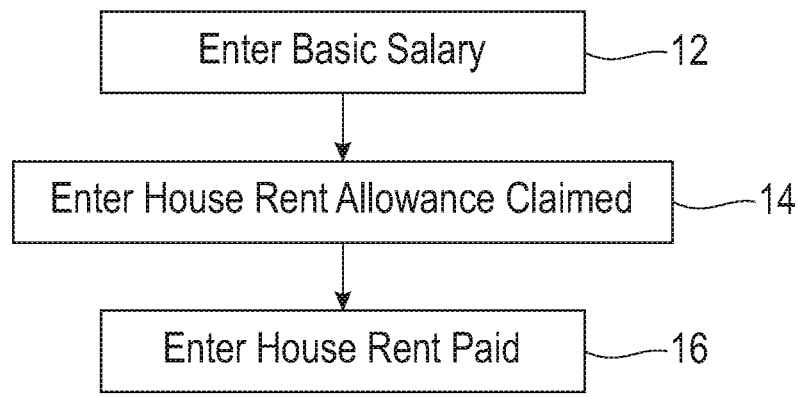
FIG. 1 is a schematic of an exemplary business process model according to one or more embodiments of the present invention.
Figure 2:
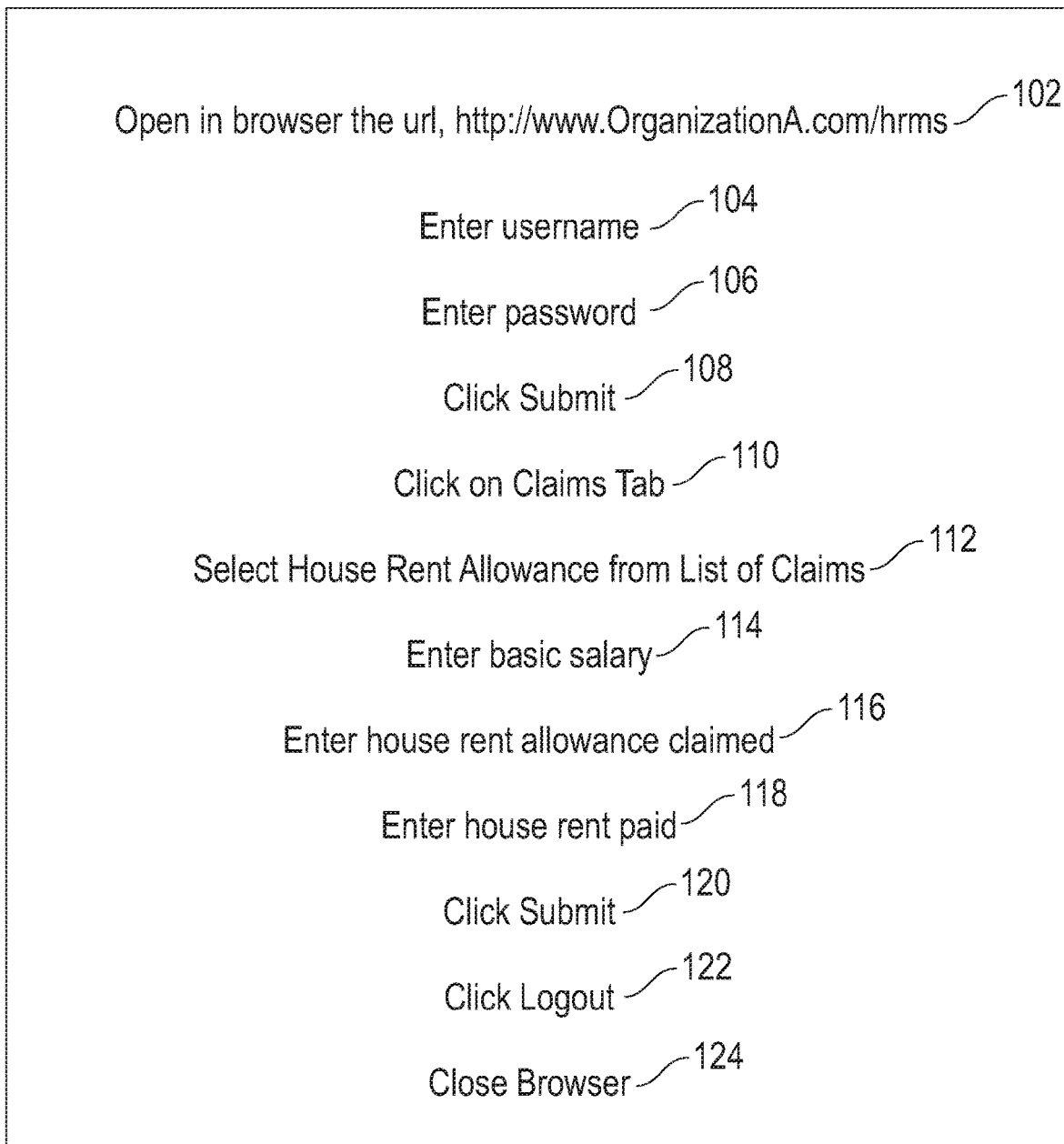
FIG. 2 is a schematic of an exemplary tutorial video for the business process model of FIG. 1 according to one or more embodiments of the present invention.

FIG. 2 illustrates an example tutorial video 100 generated by the IT personnel of organization A that corresponds to the business process model 10 of FIG. 1 to assist the end-user in claiming house rent allowance. As depicted, the tutorial video 100 is more detailed than the business process model 10 of FIG. 1 identifying additional activities to assist the end-user in carrying out the business process of the business process model 10 by providing a detailed sequential step by step instructional tool. By way of example, the tutorial video 100 includes the steps or activities of: open organization browser (STEP 102), enter username (STEP 104), enter password (STEP 106), click submit (STEP 108), click on claims tab (STEP 110), select house rent allowance from list of claims (STEP 112), enter basic salary (STEP 114), enter house rent allowance claimed (STEP 116), enter house rent paid (STEP 118), click submit (STEP 120), click logout (STEP 122), and close the browser (STEP 124).

As shown, only three activities in the tutorial video 100, namely, STEPS 114, 116 and 118, correspond to the three activities 12, 14 and 16 of the business process model 10; that is, there are more activities or steps in the tutorial video. However, the additional steps in the tutorial video are ancillary to the objective of claiming house rent allowance within the tutorial video 100. Thus, one cannot conclude that there are inconsistencies between the business process model 10 and its tutorial video 100. In fact, in this example, the business process module 10 and the tutorial video 100 are consistent due to the commonality of the three activities and the lack of any additional substantive steps or activities in the tutorial video 100.

To continue with the example and with reference to FIG. 3, assume the business process of Organization A is updated to require entry of a permanent account number (PAN) of a landlord, submission of copies of the rental agreement and submission of a copy of the rent receipt. Further assume that the tutorial video 100 is updated by IT personnel of Organization A to reflect the respective additional new steps (STEP 126), (STEP 128), (STEP 130), but the business process model 10 is not. Thus, there now is an inconsistency between the business process model 10 and the tutorial video 100; that is, the business process model 10 lacks the three new activities of the business process.

Figure 4:
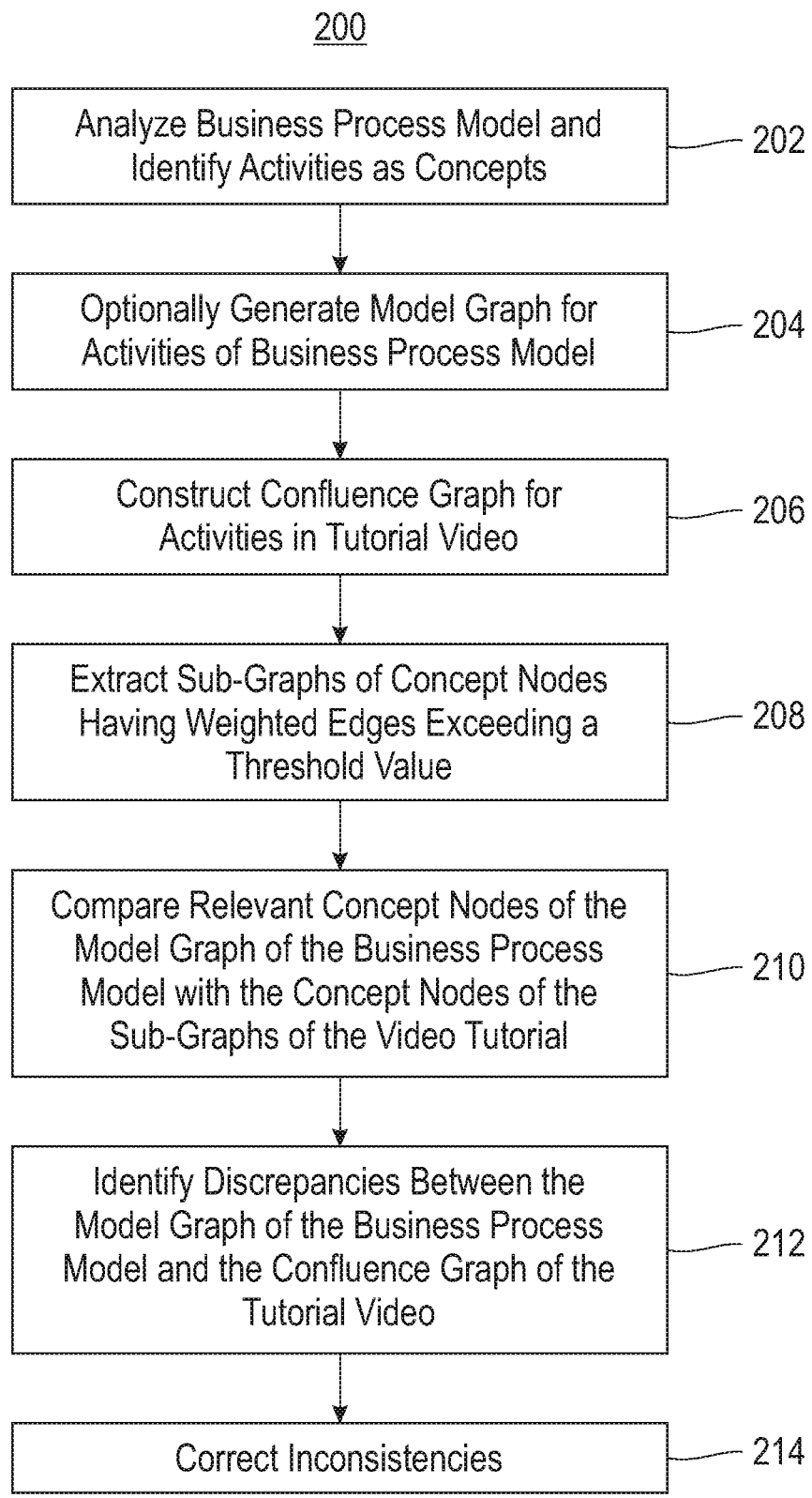
FIG. 4 is a flow chart of a process for detecting inconsistencies between a business process model and its accompanying tutorial video.

Referring now to FIG. 4, there is illustrated an exemplary process or methodology for identifying inconsistencies between a business process model and its tutorial video of the type, e.g., described in connection with FIGS. 1-3. The process of FIG. 4 is not dependent upon variations in the number of steps or inputs required by the tutorial video and the business process model, but considers commonalities in activities and concepts between the tutorial video and the business process model. More specifically, in exemplary embodiments, the process involves identifying concepts in the business process model and finding equivalent/close concepts in the tutorial video. In the following discussion, the business process model 10 and the tutorial video 100 of FIGS. 1-3 will be referenced to further assist in understanding the principles of the present invention.

Figure 5:
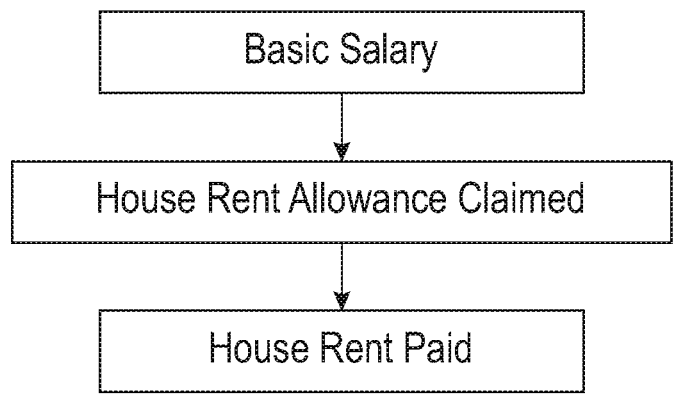
FIG. 5 is an exemplary model graph of the business process model of FIG. 1 according to one or more embodiments of the present invention.

The methodology or process 200 of FIG. 4 may be executed, for example, by IT personnel or consultants of an organization, to ensure consistency between the business process model and the tutorial video. In exemplary embodiments, the process 200 compares the tutorial video and the business process model based on text tagging, semantic similarity techniques and relevance weighting between defined activities. One exemplary initial step in the process 200 includes analyzing the business process model to identify activities and assigning a "concept" to each activity. (STEP 202). In one exemplary embodiment, speech tagging techniques are utilized, for example, by denoting nouns or noun phrases of the activities in the business process model as the concepts to create a model graph. (STEP 204). Thus, in the foregoing example discussed in connection with FIG. 1, the concepts of the business process model 10 will be identified as "basic salary," "house rent allowance claimed," and "house rent paid," as depicted in the model graph 50 of FIG. 5. These concepts are the "concept nodes" of the model graph 50.

Figure 6:
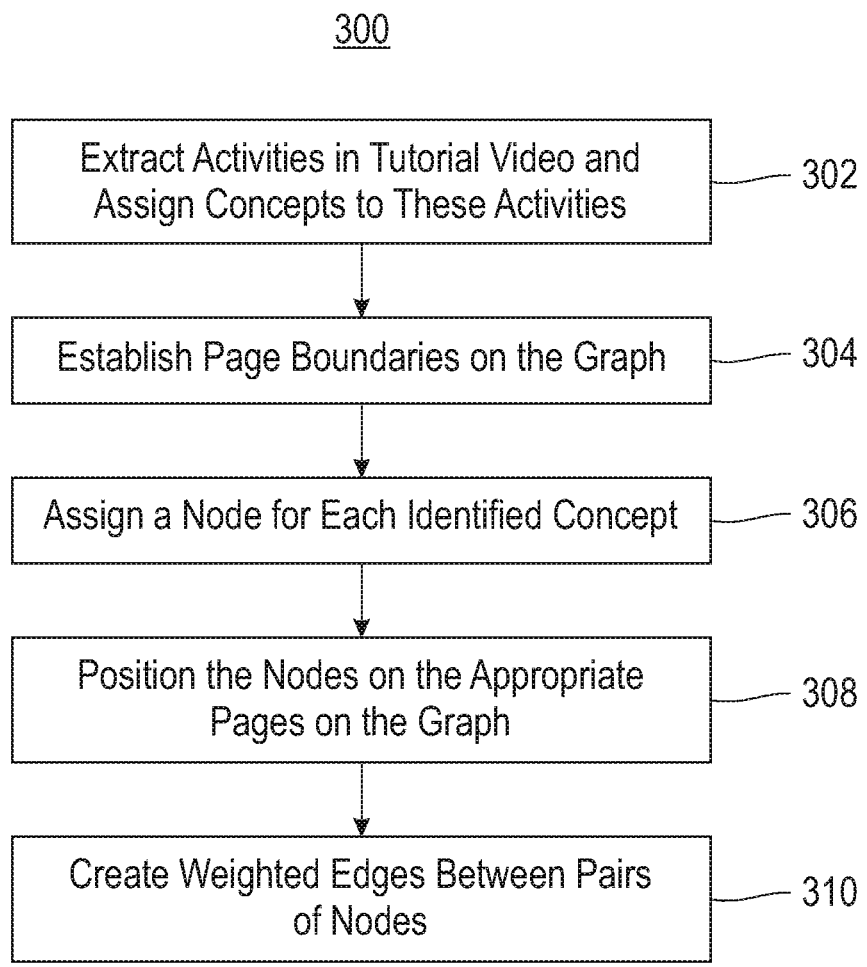
FIG. 6 is a flow chart of a process for generating a confluence graph for the tutorial video of FIG. 3 according to one or more embodiments of the present invention.

With continued reference to FIG. 4, another initial step in the process 200 for identifying inconsistencies between the business process model and its corresponding tutorial video includes constructing a confluence graph of the corresponding tutorial video. (STEP 206). One exemplary methodology 300 for constructing a confluence graph is illustrated in FIG. 6. The confluence graph is generated by extracting text of the functional activities identified from the text of the audio of the tutorial video and assigning "concepts" to these activities. (STEP 302). As discussed hereinabove, the concepts may be generally noun phrases associated with the activities. Thus, in the example discussed in connection with FIG. 3, the activity "enter username" is assigned the concept "username," the activity "enter PAN number" is assigned the concept "PAN number," the activity "upload the rental agreement" is assigned the concept "rental agreement," and the activity "upload rent receipt" is assigned the concept "rent receipt."

The process for constructing the confluence graph 300 further includes establishing page boundaries on the graph corresponding to the pages where the concepts are located within the tutorial video. (STEP 304). A concept node is assigned for each identified concept (STEP 306) and the node is positioned on the appropriate page within the confluence graph (STEP 308); that is, the page on which the concept is located in the tutorial video. For example, if one or more concepts are found on the same page of the tutorial video, these nodes are positioned on the same page of the confluence graph.

A weighted edge is created between at least some, if not all, of the pairs of nodes (STEP 310). The weighted edge is determined as the sum of the following two factors: 1) relative page difference of the user interface (UI) element representing the concepts and 2) semantic similarity of the concepts. The relative page difference is defined by the formula $1/2^n$, where n is the page difference between the concepts and where n=o for concepts on the same page. Thus, concepts on the same page of the tutorial video would be assigned a value of 1, concepts on adjacent pages would be assigned a value of ½, concepts separated by one page would be assigned a value of ¼, etc. The underlying intuition in calculating the weighted edges "w" for pairs of the concepts nodes on the confluence graph is that close/confluent concepts are typically semantically closer and also typically part of the same web page or form of the tutorial video.

Figure 7:
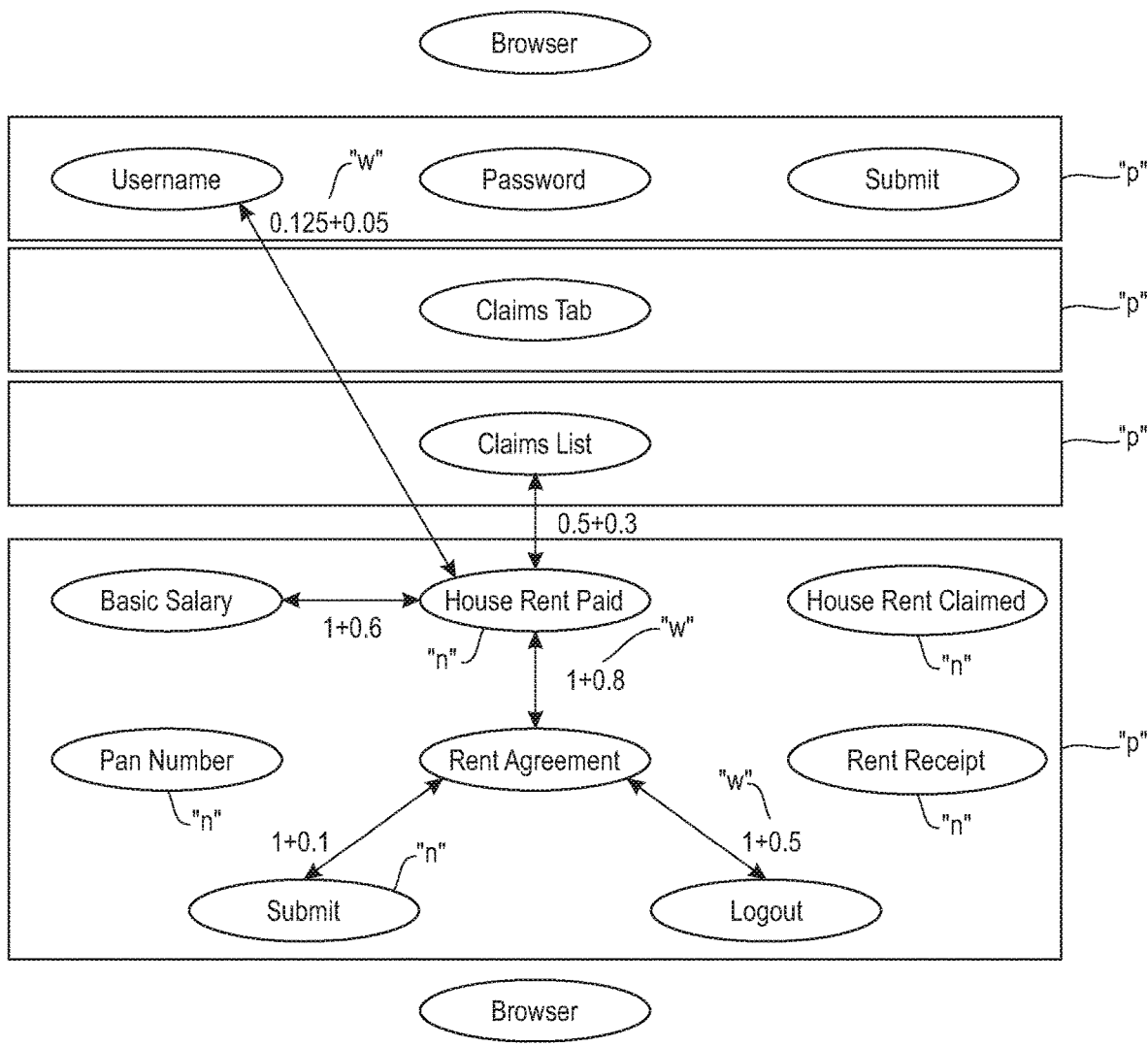
FIG. 7 is an exemplary confluence graph generated in accordance with the process of FIG. 6 according to one or more embodiments of the present invention.

FIG. 7 is an exemplary confluence graph 350 generated in accordance with the methodology illustrated in FIG. 6. In FIG. 7, the example and fact pattern of the foregoing description of the business process model and the tutorial video of FIGS. 1-3 are utilized for example purposes. As shown, the concept nodes or vertices "n" represent the concepts extracted from the tutorial video. The rectangular boxes "p" represent the page or form boundaries within the tutorial video. For example, the concepts "username," "password," and "submit" are all located within the login form/page and are thus are positioned within the same box "p" of the confluence graph 350. Similarly, the concepts "basic salary," "rent paid," and "rent receipt" are all on the same page and thus assigned the same box "p" in the confluence graph 350. Also depicted in the graph are the weighted edges "w" assigned between some of the nodes "n." Not all of the weighted edges "w" are shown for clarity purposes. The weighted edges "w" are detailed in the form "a+b," wherein "a" is the "relative page distance weight" and "b" is the "semantic similarity weight." Once all of the weighted edges "w" are constructed and assigned a valuation, the pairs of nodes "n" having the highest valuations for the weighted edges "w" (that is, values above a predetermined threshold value) are identified. These nodes (concepts) which are "close" or "confluent" to each other (exceeding the predetermined threshold value) may require a comparison with the model graph 10 extracted from the business process.

In one or more example embodiments, the predetermined threshold value for the weighted edges "w" can be determined via a machine learning algorithm such as logistic regression where a set of tutorial videos may be subject to analysis to produce a value indicative of close/confluent concepts. Other methodologies may also be utilized.

With reference again to the process 200 for identifying inconsistencies set forth in FIG. 4, the "close" or "confluent" nodes "n" are extracted as sub-graph(s) of the confluence graph. (STEP 208). The sub-graph that is semantically most similar to the concepts identified in the business process model, for example, with the concepts identified in the model graph of the business process model, is selected for comparison. (STEP 210). Inconsistencies or discrepancies are identified between the concepts of the model graph and the confluence graph of the tutorial video. (STEP 212). In the event there are mismatches or inconsistencies, these inconsistencies are corrected, by, for example, updating the business process model or the tutorial video. (STEP 214).

Figure 8:
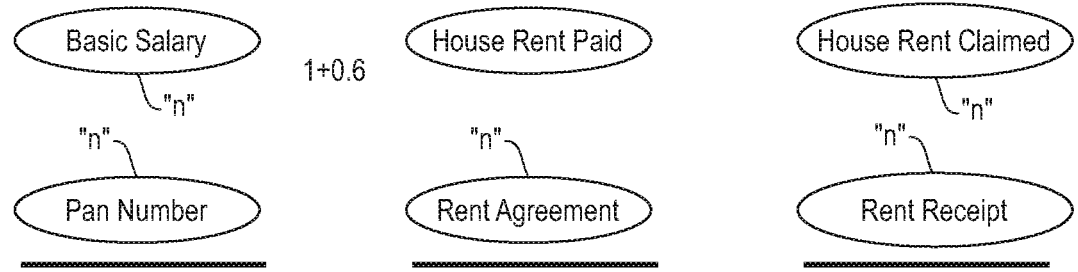
FIG. 8 is a graph isomorphism between the business process model and a sub-graph of the confluence graph of the tutorial video.

In one exemplary embodiment, the inconsistencies identified in connection with STEP 212 may be ascertained by performing a graph isomorphism comparing the model graph of the business process model and the similar sub-graph of the confluence graph (CCG) derived from the tutorial video. One exemplary graph isomorphism 400 between the model graph of the business process model and the confluence graph of the tutorial video is depicted in FIG. 8.

One rectangular box 402 shows the concepts from the model graph of the business process model, while the other rectangular box 404 shows the confluent/close concepts or sub-graphs extracted from the confluence graph of the tutorial video. The concepts of "username" and "password" of the confluence chart of FIG. 7 are also close to each other as they are close semantically and also on the same page, but they are semantically far from the concepts in the business process model (basic salary, house rent allowance claimed, house rent paid) and hence are not selected for the comparison in the graph isomorphism 400. The graph isomorphism 400 between the two graphs will show that there is an inconsistency (the underlined nodes "n") between the model graph of the business process model and the sub-graph of the confluence graph of the tutorial video. Specifically, the sub-graph of the confluence graph of the tutorial video includes three concepts, namely "PAN Number," "Rent Agreement," and "Rent Receipt," not present in the model graph of the business process model. Note the concepts of the model graph are consistent with the concepts of the first line of the subgraph of the confluence graph; thus, there is consistency with respect to those activities or concepts (that is, "basic salary," "house rent paid," and "house rent (allowance) claimed").

Figure 9:
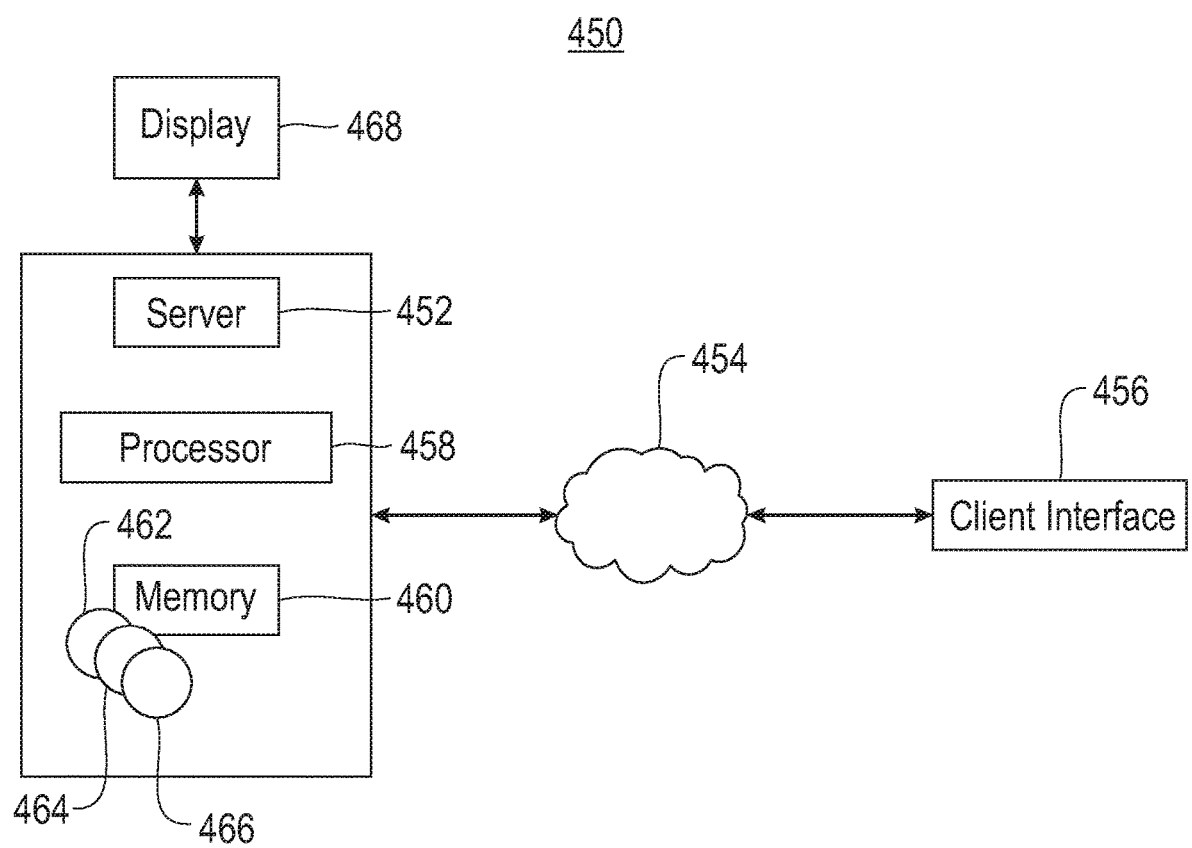
FIG. 9 is a schematic illustration of an exemplary system for detecting inconsistencies in a business process model and its accompanying tutorial video.

FIG. 9 is a schematic illustration of an exemplary system 450 for detecting inconsistencies in a business process model and its accompanying tutorial. The system 450 includes a server 452 which communicates via a network 454 with one or more client interfaces 456. The server 452 includes one or more processors 458 for executing a process, algorithm or logic, and memory 460 which contains the algorithms to be executed and other data pertaining to the tutorial videos and the business process models. The memory 460 may include one or more programs or algorithms for extracting activity and concept data from the business process model and the tutorial video 462, one or more programs for creating the concepts nodes, the model graphs and confluence graphs 464, and an inconsistency/consistency analyzer or algorithm 466 for comparing the model and the confluence graphs. A display 468 may be provided to view the model graph, confluence graph and/or the graph isomorphism.

As detailed herein, embodiments of the invention can include a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 10:
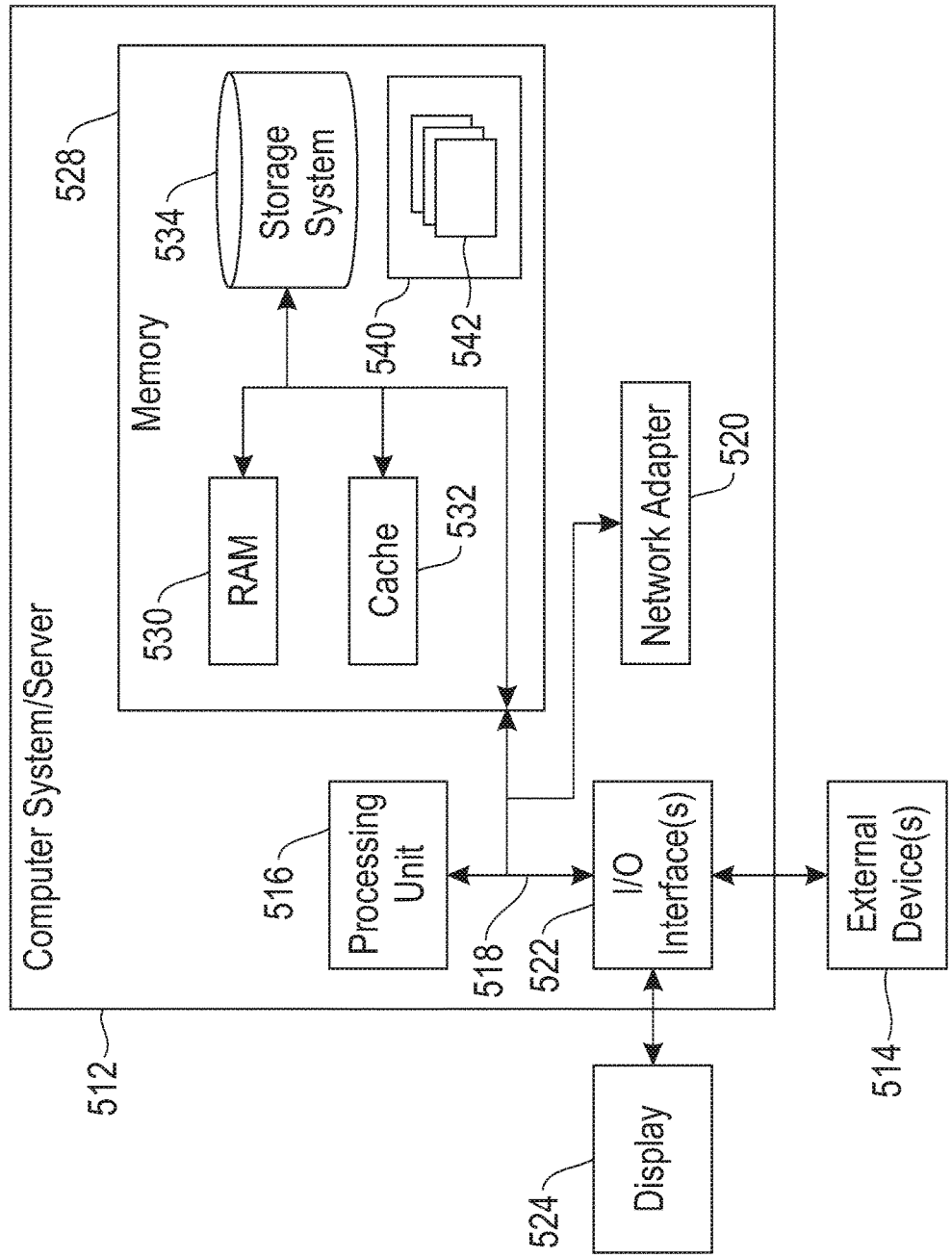
FIG. 10 depicts a computer system in accordance with which one or more components/steps of techniques of the invention may be implemented, according to one or more embodiments of the present invention.

One or more embodiments can make use of software running on a general-purpose computer or workstation. With reference to FIG. 10, in a computing node 510 there is a computer system/server 512, which is operational with numerous other general purposes or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, mobile and wearable devices, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the application. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the application as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

It is to be understood that implementation of the teachings recited herein are not limited to a particular computing environment. Rather, embodiments of the present invention are capable of being implemented in conjunction with any type of computing environment now known or later developed.

For example, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
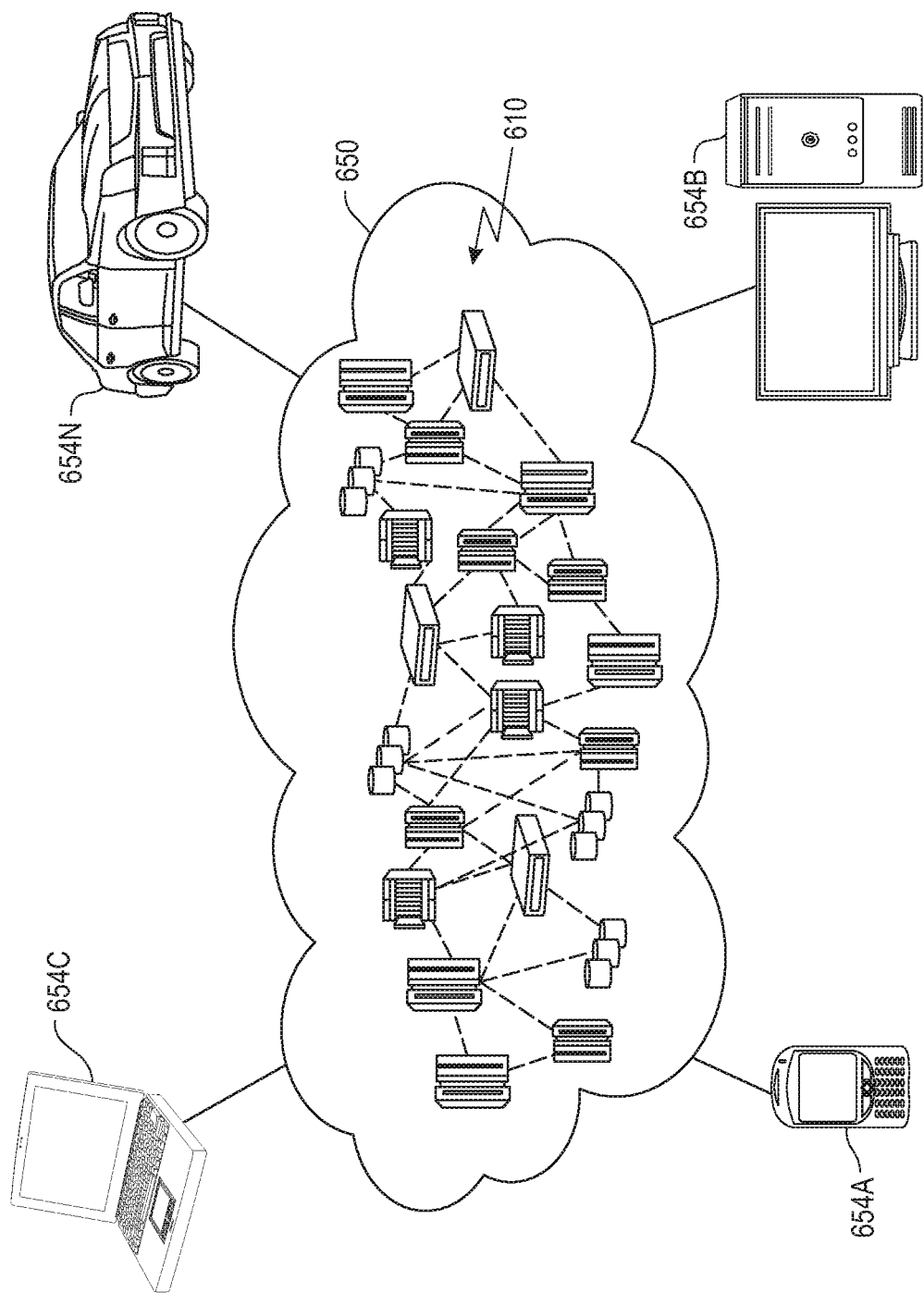
FIG. 11 depicts a cloud computing environment, according to one or more embodiments of the present invention.

Referring now to FIG. 11, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 11 are intended to be illustrative only and that computing nodes 610 and cloud computing environment 650 can communicate with any type of computerized device over any type of network and/or network addressable connection (e.g., using a web browser).

Figure 12:
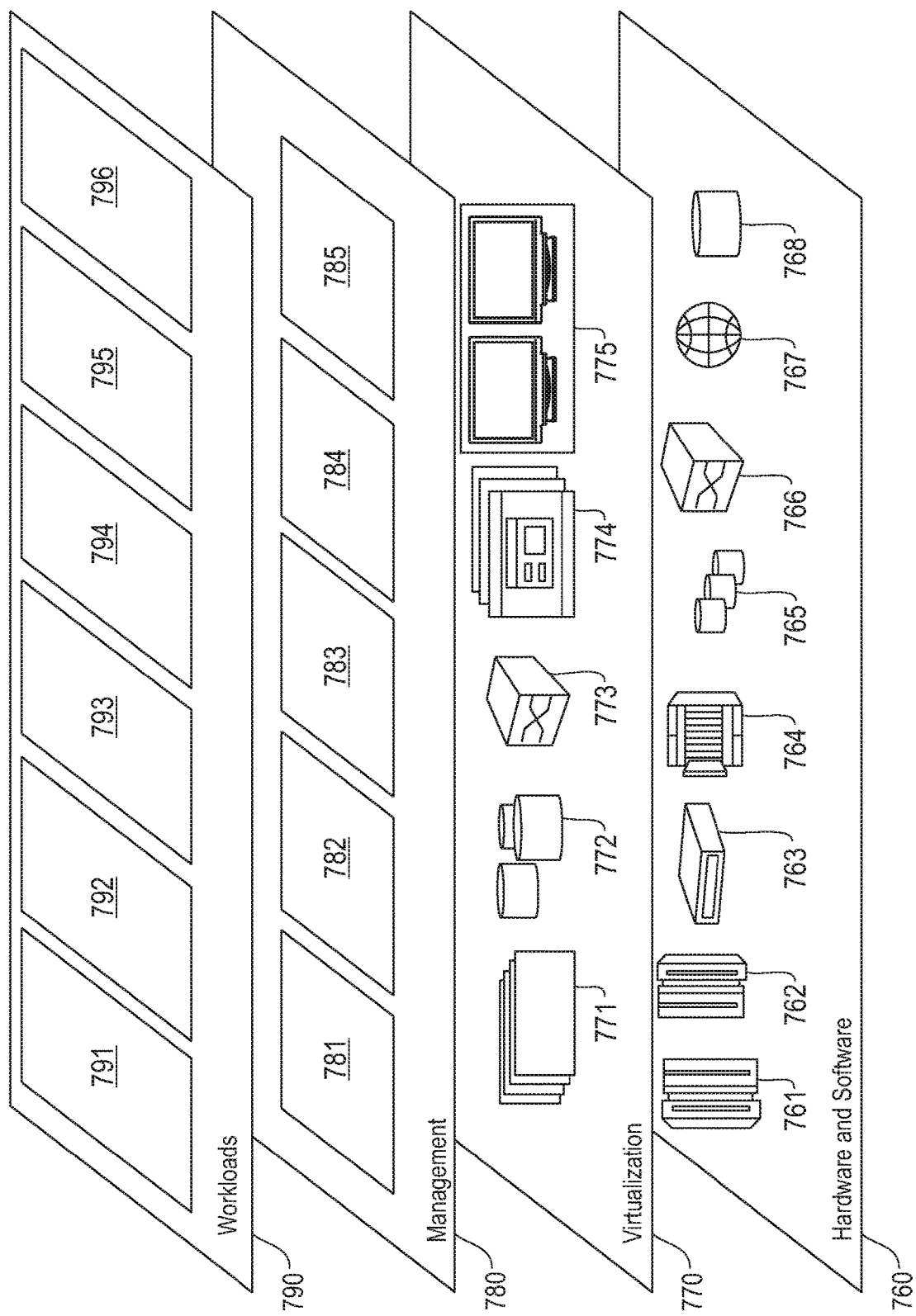
FIG. 12 depicts abstraction model layers, according to one or more embodiments of the present invention.

Referring now to FIG. 12, a set of functional abstraction layers provided by cloud computing environment 650 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and comparison processing 796, which may perform various functions described above with respect to detecting inconsistencies between a business process model and its corresponding tutorial video using the methodologies and techniques described herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical invention or technical improvement over technologies found in the marketplace, or to enable others of ordinary skill in the art to understand the embodiments disclosed herein.

What is claimed is:

1. A computer-implemented method, comprising steps of:
identifying activities within a business process model and assigning a concept to each activity within the business process model;
constructing a confluence graph for a tutorial video corresponding to the business process model by (i) generating text corresponding to audio of the tutorial video and identifying activities within the text (ii) assigning a concept for each activity within the text and creating a concept node, within the confluence graph, for each concept assigned to an activity within the text, and (iii) creating a weighted edge between one or more pairs of the concept nodes of the confluence graph;
applying a linear regression-based machine learning model to the tutorial video to determine a particular value indicative of confluent concepts of the tutorial video, wherein the linear regression-based machine learning model is trained on a set of tutorial videos to output the particular value;
extracting one or more sub-graphs of the confluence graph by grouping pairs of concept nodes having weighted edges greater than the particular value;
selecting at least one of the extracted sub-graphs and comparing the concepts of the business process model and the concept nodes of the at least one extracted sub-graph of the confluence graph to identify inconsistencies between the business process model and the corresponding tutorial video; and
outputting the identified inconsistencies to at least one user;
wherein the steps are performed by at least one processor having logic and memory.

2. The computer-implemented method of claim 1, comprising:
generating a model graph of the business process model and creating a concept node for each concept assigned to an activity within the business process model, wherein said comparing the concepts comprises comparing the concept nodes of the model graph with the concept nodes of the confluence graph.

3. The computer-implemented method of claim 1, wherein said creating the weighted edge is based on at least a relative page distance of a user interface element within the tutorial video of the one or more pairs of the concept nodes of the confluence graph.

4. The computer-implemented method of claim 3, wherein said creating the weighted edge is based on at least semantic similarity between the concepts of the one or more pairs of the concept nodes of the confluence graph.

5. The computer-implemented method of claim 4, wherein the weighted edge is represented as the sum of (i) the relative page distance and (ii) the semantic similarity.

6. The computer-implemented method of claim 1, wherein said selecting the one sub-graph comprises selecting a sub-graph having concepts which are semantically similar to the concepts derived from the business process model.

7. The computer-implemented method of claim 6, comprising performing a graph isomorphism comparing the sub-graph of the confluence graph with the model graph.

8. The computer-implemented method of claim 1, wherein said identifying activities within the business process model comprises assigning noun phrases as the concepts.

9. The computer-implemented method of claim 8, wherein said constructing the confluence graph includes assigning the noun phrases as the concepts in the concept nodes.

10. A computer program product comprising a non-transitory processor-readable storage medium having program instructions encoded therein, the program instructions executable by one or more processing devices to cause the one or more processing devices to:
identify activities within a business process model and assigning a concept to each activity within the business process model;
construct a confluence graph for a tutorial video corresponding to the business process model by (i) generating text corresponding to audio of the tutorial video and identifying activities within the text (ii) assigning a concept for each activity within the text and creating a concept node, within the confluence graph, for each concept assigned to an activity within the text, and (iii) creating a weighted edge between one or more pairs of the concept nodes of the confluence graph;
apply a linear regression-based machine learning model to the tutorial video to determine a particular value indicative of confluent concepts of the tutorial video, wherein the linear regression-based machine learning model is trained on a set of tutorial videos to output the particular value;
extracting one or more sub-graphs of the confluence graph by grouping pairs of concept nodes having weighted edges greater than the particular value;
select at least one of the extracted sub-graphs and compare the concepts of the business process model and the concept nodes of the at least one extracted sub-graph of the confluence graph to identify inconsistencies between the business process model and the corresponding tutorial video; and
output the identified inconsistencies to at least one user.

11. The computer program product of claim 10, wherein the program instruction cause the one or more processing devices to:
generating a model graph of the business process model and creating a concept node for each concept assigned to an activity within the business process model, wherein said comparing the concepts comprises comparing the concept nodes of the model graph with the concept nodes of the confluence graph.

12. The computer program product of claim 10, wherein said identifying activities within the business process model comprises assigning noun phrases as the concepts.

13. A system, comprising:
a memory; and
at least one processor operably coupled to the memory and configured for:
identifying activities within a business process model and assigning a concept to each activity within the business process model;
constructing a confluence graph for a tutorial video corresponding to the business process model by (i) generating text corresponding to audio of the tutorial video and identifying activities within the text (ii) assigning a concept for each activity within the text and creating a concept node, within the confluence graph, for each concept assigned to an activity within the text, and (iii) creating a weighted edge between one or more pairs of the concept nodes of the confluence graph;

applying a linear regression-based machine learning model to the tutorial video to determine a particular value indicative of confluent concepts of the tutorial video, wherein the linear regression-based machine learning model is trained on a set of tutorial videos to output the particular value;

extracting one or more sub-graphs of the confluence graph by grouping pairs of concept nodes having weighted edges greater than the particular value;

selecting at least one of the extracted sub-graphs and comparing the concepts of the business process model and the concept nodes of the at least one extracted sub-graph of the confluence graph to identify inconsistencies between the business process model and the corresponding tutorial video; and outputting the identified inconsistencies to at least one user.

14. The system of claim 13, wherein the at least one processor is operably coupled to the memory and configured for:

generating a model graph of the business process model and creating a concept node for each concept assigned to an activity within the business process model, wherein said comparing the concepts comprises comparing the concept nodes of the model graph with the concept nodes of the confluence graph.

15. A computer-implemented method, comprising steps of:

identifying activities within a business process model and assigning a concept to each activity within the business process model;

generating text from audio of a tutorial video corresponding to the business process model;

identifying activities within the text;

assigning a concept for each activity within the text;

constructing a confluence graph for the tutorial video corresponding to the business process model at least in part by creating a respective concept node for each of the assigned concepts within the confluence graph and creating a weighted edge between one or more pairs of the concept nodes of the confluence graph;

applying a linear regression-based machine learning model to the tutorial video to determine a particular value indicative of confluent concepts of the tutorial video, wherein the linear regression-based machine learning model is trained on a set of tutorial videos to output the particular value;

extracting one or more sub-graphs of the confluence graph by grouping pairs of concept nodes having weighted edges greater than the particular value;

selecting at least one of the extracted sub-graphs and comparing the concepts of the business process model and the concepts within the text of the tutorial video based at least in part on the concept nodes of the at least one extracted sub-graph of the confluence graph to identify inconsistencies between the business process model and the corresponding tutorial video; and outputting the identified inconsistencies to at least one user;

wherein the steps are performed by at least one processor having logic and memory.

16. The computer program product of claim 10, wherein said creating the weighted edge is based on at least a relative page distance of a user interface element within the tutorial video of the one or more pairs of the concept nodes of the confluence graph.

17. The computer program product of claim 16, wherein said creating the weighted edge is based on at least semantic similarity between the concepts of the one or more pairs of the concept nodes of the confluence graph.

18. The computer program product of claim 17, wherein the weighted edge is represented as the sum of (i) the relative page distance and (ii) the semantic similarity.

19. The computer program product of claim 10, wherein said selecting the one sub-graph comprises selecting a sub-graph having concepts which are semantically similar to the concepts derived from the business process model.

20. The computer program product claim 19, comprising performing a graph isomorphism comparing the sub-graph of the confluence graph with the model graph.

* * * * *